Figure 1:
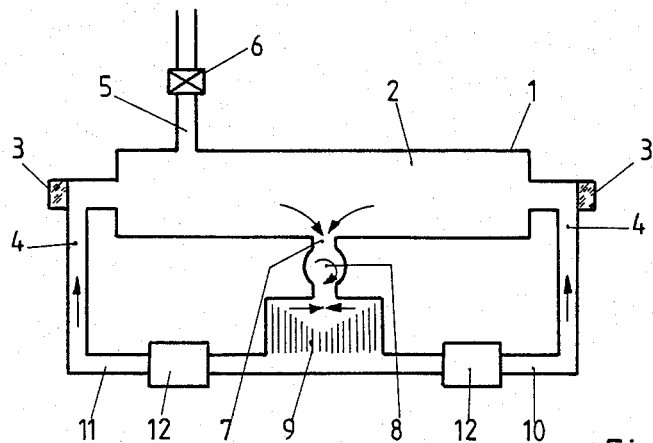

United States Patent [19]

Hohla et al.

[11] Patent Number: 4,534,034
[45] Date of Patent: Aug. 6, 1985

[54] DISCHARGE-PUMPED LASER

[75] Inventors: Kristian Hohla; Ernst Albers, both of Göttingen, Fed. Rep. of Germany

[73] Assignee: Lambda Physik GmbH, Göttingen, Fed. Rep. of Germany

[21] Appl. No.: 476,221

[22] Filed: Mar. 17, 1983

[30] Foreign Application Priority Data

Apr. 7, 1982 [DE] Fed. Rep. of Germany ....... 3212928

[51] Int. Cl.³ .............................................. H01S 3/22
[52] U.S. Cl. ......................................... 372/59; 372/58
[58] Field of Search ................... 372/55, 58, 59, 33; 350/574

[56] References Cited

U.S. PATENT DOCUMENTS 3,704,053 11/1972 Farmer .................................. 350/574

Primary Examiner—William L. Sikes
Assistant Examiner—Léon Scott, Jr.
Attorney, Agent, or Firm—Max Fogiel

[57] ABSTRACT

A discharge-pumped laser with a discharge tube (1) that contains a mixture (2) of gases, that has gas inlets (4) in the vicinity of its windows (3), that has a gas outlet (7), and that is connected by lines (10, 11) and by a circulating pump (8) to a purification device that is an electrostatic filter (9) to purify the gas mixture of particles of dust without changing its composition. The gas-circulation system includes a zone (12) in which the mixture of gases being conveyed back to the gas inlets (4) becomes quiescent.

3 Claims, 2 Drawing Figures

DISCHARGE-PUMPED LASER

The invention is a discharge-pumped laser with a discharge tube that contains a mixture of gases, that has gas inlets in the vicinity of its windows, that has a gas outlet, and that is connected by lines and by a circulating pump to a purification device.

Gas lasers that are excited by an electric discharge are frequently subject to aging. The gas gets used up by being chemically converted in the discharge zone, and particles of dust or aerosols form. Several processes that have not yet been completely explained are responsible for the formation of particles of dust. Electrode consumption play a significant part. Gas discharge occurs between two electrodes to which an electric voltage is applied. When the gas or mixture of gases is sufficiently electrically conductive, a current will flow, leading to considerable stress on the surface of the electrodes at the interface between the gas and the electrode material. Local heating and mechanical stress at the atomic level as the result of the acceleration of charged particles in the electric field will erode the electrodes. Microscopically fine particles are ejected and form dust that will accompany the gas or mixture of gases through the whole inside of the laser, causing many types of problem. The laser effect or laser action will be affected in many ways:

1. The dust precipitates on electrically insulating constituents. Alterations in the surface will change its insulating properties. Lateral discharges or even discharge channels of the nature of short circuits will form that will destroy the function of the laser.

2. The dust filters out the laser radiation. Scattering against the particles of dust decreases laser output. This effect is especially powerful in lasers that emit ultraviolet light because the scatter increases very powerfully towards the shorter wavelengths.

It is not only the presence and distribution of dust particles that cause problems. Gaseous contaminants also form in gas lasers, and can not only alter the physical processes that occur in gas discharge but also lead to powerful absorption that will considerably decrease output.

Various approaches to counteracting the aforesaid drawbacks and the associated curtailment of the life of such lasers have been proposed. Since the dust forms mostly in the discharge zone, circulating the gas mixture ought to drive the dust rapidly out of the danger zone so that it could settle in a safe section of the circulation system. This approach does not, however, lead to an overall solution because it does not prevent a small proportion of the dust from precipitating in the vicinity of the discharge. Furthermore, pressure waves that drive the particles into the danger zone occur, especially when discharge is pulsed.

Keeping especially sensitive sections of the discharge zone or of the laser dust-free by washing them with a continuous flow of laser gas or gas mixture that is too fresh to be contaminated with dust is also known. Although this approach does keep the washed sections clean, it has the disadvantage of using up a lot of gas. To decrease the consumption of gas, a gas-circulation system in which a purification device and circulating pump are employed to precipitate significant constituents of the gas, specifically the halogen constituents, and, with them, the contaminants, in a component gas current has been proposed (Mace, Ph. N., "State of the art in discharge-pumped excimer laser systems in the United States," Second Australian Laser Conference, Canberra, Sept. 1–4, 1981, LA-UR-81-2541, Los Alamos Scientific Laboratory). The present invention is based on that system. Since these gas constituents are present only in low concentrations, an equivalent amount of the precipitated gas must be constantly returned to circulation. Once the gas, meaning just the halogen constituents, has precipitated, the remaining proportion of gas is conveyed out of the mixture again to gas inlets in the vicinity of the windows in the discharge tube, washing the windows. This process, which has also been described by R. Tennant ("Control of contaminants in XeCl lasers," *Laser Focus*, Oct. 1981, 65–68), is expensive.

Another passage in the literature (Kutschke, K. O., Hakkett, P. A., and Willis, C., *Rev. Sci. Instrum.* 52 (II), 1655 [Nov. 1981]) describes a method that is exactly the reverse to the extent that instead of purifying the gas at the expense of the halogen constituents it reprocesses the most expensive components of the gas mixture. By far the largest proportion, the more costly constituents of the gas, are extracted and each is replaced with fresh gas. This process, however, is also expensive and will not begin to pay for itself until it has been in operation for a very long time, the cited passage mentioning 100 days and this assumes operating 5 hours per day, whereas the laser works at a repetition rate of 100 Hz.

To summarize, the methods described in the literature involve purification devices that consume significant constituents of the gas mixture, which must be subsequently replaced at significant expense.

The invention is intended as an improved laser of the type initially described in which the gas mixture is purified to increase the life of the laser but in which the gas constituents do not have to be supplemented to maintain the original proportions of the mixture.

This objective is obtained in accordance with the invention in that the purification device is an electrostatic filter and in that the gas-circulation system includes a zone in which the mixture of gases being conveyed back to the gas inlets becomes quiescent. It now becomes possible to convey all or part of the gas through the electrostatic filter, where the particles of dust are precipitated but not the gas constituents. The composition of the gas does not change. Upon passing through the electrostatic filter, the gas mixture can be conveyed to the sensitive components of the system, especially the windows, and utilized as a washing gas. The contamination with dust-like particles that limits the life of the optical components will be eliminated and the life of the laser prolonged. Not only the utilization of an electrostatic filter, however, but also the simultaneous availability of a quiescence zone is of special significance. Some of the gas mixture gets regenerated in this zone and is washed into the sensitive zones of the laser to prevent the destructive deposit of gas.

The electrostatic filter can simultaneously be designed as a quiescence zone. Since its flow-through cross-section is wider than that of the lines, it stabilizes the current and prolongs the residence of the gas in the filter, allowing some of the mixture to regenerate. The electrostatic filter matches the voltages employed in ignition and applied to the filter collectors to the types and dimensions of the precipitated dust particles. The filter can either be integrated into the discharge tube or employed in a gas-circulation system with appropriate lines. The level of purity to be obtained can be adjusted by varying the rate of flow through the electrostatic filter. The low rate of flow and the resultingly prolonged residence of the gas in the filter or in the quiescence zone will also cause gaseous contaminants to react back again. This will not only clean out the dust particles but also, surprisingly, reduce the number of destructive gaseous constituents. Washing the threatened components with purified gas prevents dust from settling on them and aging them. One advantage of the specified solution is that only some of the gas mixture has to be purified to keep the sensitive components clean. The use of an electrostatic filter makes it unnecessary to introduce or carry out any new process within the gas-circulation system as must be done when chemical precipitation is employed as in state of the art. Electrostatic filters have glow discharges that ionize the gas and dust particles. The process is very similar to what occurs in the actual laser discharge. The filter collectors are metal plates that introduce no additional contamination. The employment of only some of the laser gas and the exploitation of only some of the gas to keep the components of the system clean means that the electrostatic filter can be relatively small. This avoids the expensive and time-consuming readdition and reprocessing of the gas.

The invention is especially relevant to what are called noble-gas halogenide lasers, which operate with mixtures of noble and halogen gases.

Figure 2:
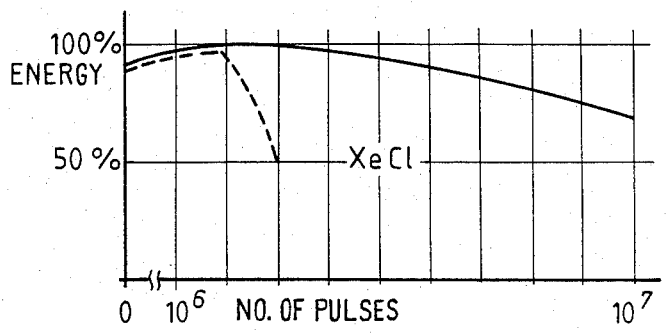

One embodiment of the invention will now be specified with reference to the drawing, in which FIG. 1 is a diagram of a laser and purification device and FIG. 2 is a graph illustrating energy per laser burst as a function of the number of bursts.

The discharge tube 1 in FIG. 1 is filled with a gas mixture 2. Both ends of discharge tube 1 are closed off by optical components in the form of windows 3. Gas inlets 4 are positioned close enough to windows 3 for the current of gas to wash them as it enters the tube. Discharge tube 1 has another gas inlet 5 that supplies fresh gas mixture 2 and is equipped with a metering valve 6.

Discharge tube 1 also has a gas outlet 7 connected to a pump 8 that is downstream of an electrostatic filter 9. Lines 10 and 11 lead from filter 9 through zones 12 of quiescence to gas inlets 4 in the vicinity of window 3. Since, as will be evident from the figure, electrostatic filter 9 also functions, with its much more extensive cross-section, as a quiescence zone, the separate positioning of quiescence zones 12 in lines 10 is redundant.

In operation, all or part of gas mixture 2 is pumped through pump 8. The entrained dust particles are precipitated in electrostatic filter 9, but with no gas constituents getting precipitated along with them. Since the gas gets regenerated in quiescence zones 12, or even upstream of them in electrostatic filter 9, windows 3 will be washed and kept clean with a purified gas mixture of the same composition as that in discharge tube 1.

The specified purification and regeneration were tested in a typical excimer gas discharge. FIG. 2 illustrates the results. Energy per laser burst is layed off along the ordinate (y), while the abscissa shows the number of bursts. The broken curve shows the life of an XeCl laser without an electrostatic filter. It is evident that laser energy drops by about $\frac{1}{2}$ at approximately $3 \times 10^6$ bursts. The continuous curve represents the life of the same type of laser in which the gas is purified and regenerated, which obviously increases life by a factor of 3. The decrease in energy can no longer be ascribed to dirt on the optical components but is to be explained as the result of dissipation of the laser gas.

Through-window transmission, which represents a standard for the cleanliness of the window surface, decreased 30% after $3 \times 10^6$ bursts from a laser without purification and regeneration, whereas it hardly decreased at all by that time in a laser with an electrostatic filter and quiescence zone in accordance with the invention. This indicates that the optical components were cleaned and kept clean very successfully and at very low cost in accordance with the invention. Nor was the laser gas additionally contaminated in comparison with conventional operation.

We claim:

1. In a discharge-pumped laser, an arrangement comprising: discharge tube containing a mixture of gases; said discharge tube having gas inlets and windows for closing off ends of said tube, said gas inlets being located in vicinity of said windows; said discharge tube having a gas outlet; a circulating means and purification means, said discharge tube being connected by lines and by said circulating means to said purification means; said purification means comprising an electrostatic filter; said gas circulating means including a quiescence zone wherein a mixture of gases conveyed back to said gas inlets becomes quiescent, said purification means removing dust particles from said gases and said quiescence zone regenerating said gases for increasing gas lifetime of the laser, composition of said mixture of gases remaining unchanged by said purification means.

2. In a laser as defined in claim 1, wherein said electrostatic filter comprises also a zone of quiescence.

3. In a laser as defined in claim 1, wherein voltages are applied for ignition and to said filter, said voltages being dependent on types and dimensions of precipitated dust particles.

* * * * *